US012575484B2

(12) United States Patent
Ghiraldi et al.

(10) Patent No.: US 12,575,484 B2
(45) Date of Patent: Mar. 17, 2026

(54) METHOD FOR OPTIMIZING THE AMOUNT OF SLURRY SPREAD ON A SOIL TO BE FERTILIZED AND CORRESPONDING SLURRY SPREADING APPARATUS

(71) Applicant: DINAMICA GENERALE S.P.A., Poggio Rusco (IT)

(72) Inventors: Andrea Ghiraldi, Poggio Rusco (IT); Anna Ghiraldi, Poggio Rusco (IT)

(73) Assignee: DINAMICA GENERALE S.P.A., Poggio Rusco (IT)

( * ) Notice: Subject to any disclaimer, the term of this patent is extended or adjusted under 35 U.S.C. 154(b) by 542 days.

(21) Appl. No.: 18/070,951

(22) Filed: Nov. 29, 2022

(65) Prior Publication Data

US 2023/0165186 A1    Jun. 1, 2023

(30) Foreign Application Priority Data

Dec. 1, 2021    (IT) ........................ 102021000030479

(51) Int. Cl.
*A01C 23/00*        (2006.01)
*B05B 12/08*        (2006.01)
(Continued)

(52) U.S. Cl.
CPC .......... *A01C 23/007* (2013.01); *A01C 23/002* (2013.01); *B05B 12/08* (2013.01);
(Continued)

(58) Field of Classification Search
CPC ..... A01C 23/002; A01C 23/007; B05B 12/08; B05B 12/085; B05B 12/10; B05B 12/12; B05B 12/126
See application file for complete search history.

(56) References Cited

U.S. PATENT DOCUMENTS 6,067,917 A * 5/2000 Nimberger ........... A01C 23/024
                                                111/119
2011/0036923 A1* 2/2011 Zunhammer ........ A01C 23/007
                                                239/63
(Continued)

FOREIGN PATENT DOCUMENTS

EP        0846408 A1    6/1998
EP        2107865 B1    7/2017
EP        3498069 A1    6/2019

OTHER PUBLICATIONS

Italian Search Report and Written Opinion in IT Application No. 202100030479, mailed Jun. 22, 2022 (9 pages) (an English translation attached herewith).

*Primary Examiner* — Tuongminh N Pham
(74) *Attorney, Agent, or Firm* — Leason Ellis LLP

(57) ABSTRACT

A method for optimising the amount of slurry that is spread on a soil to be fertilised by means of a vehicle comprising a slurry spreader device fed by a tank through at least one conduit, wherein the concentration of at least one slurry ingredient in the conduit is acquired, a pressure difference between two points in the feed conduit upstream and downstream of a valve and the speed of the vehicle are measured, an effective volumetric flow rate of the slurry is calculated as a function of the measured pressure difference and a target volumetric flow rate of the slurry is calculated as a function of a target spreading factor and concentration of the ingredient, the measured speed and a spreading width of the slurry spreader device, and the valve is adjusted as a function of the difference between the effective volumetric flow rate and the target volumetric flow rate.

13 Claims, 2 Drawing Sheets

(51) Int. Cl.

| | | |
|---|---|---|
| B05B 12/10 | (2006.01) |
| B05B 12/12 | (2006.01) |
| G01N 1/40 | (2006.01) |

(52) U.S. Cl.

CPC ............ B05B 12/085 (2013.01); B05B 12/10 (2013.01); B05B 12/12 (2013.01); B05B 12/126 (2013.01); G01N 1/40 (2013.01)

(56) References Cited

U.S. PATENT DOCUMENTS

| | | | |
|---|---|---|---|
| 2011/0130927 A1* | 6/2011 | Zunhammer | ........ A01C 23/007 |
| | | | 701/50 |
| 2017/0348718 A1* | 12/2017 | Preheim | ............... A01C 23/007 |
| 2018/0168096 A1* | 6/2018 | Ducamps | ........... G05D 16/2066 |
| 2020/0037519 A1 | 2/2020 | Wonderlich et al. | |
| 2021/0061726 A1* | 3/2021 | Toft | ......................... A61L 2/18 |
| 2022/0272959 A1* | 9/2022 | Bremer | ................ A01C 23/007 |
| 2023/0173415 A1* | 6/2023 | Swanson | .............. F04B 43/023 |
| | | | 210/808 |

* cited by examiner

1

METHOD FOR OPTIMIZING THE AMOUNT OF SLURRY SPREAD ON A SOIL TO BE FERTILIZED AND CORRESPONDING SLURRY SPREADING APPARATUS

CROSS-REFERENCE TO RELATED APPLICATIONS

This application claims priority from Italian patent application no. 102021000030479 filed on Dec. 1, 2021, the content of which is incorporated herein by reference.

TECHNICAL FIELD

The present invention concerns a method for optimising the amount of slurry spread on a soil to be fertilised and a corresponding apparatus for spreading the slurry on a soil to be fertilised.

In particular, the present invention finds advantageous, but not exclusive, application applied in an agricultural vehicle configured as a self-propelled vehicle or as a trailer towable by a tractor, to which the following description will explicitly refer without loss of generality.

BACKGROUND

Agricultural vehicles used to spread slurry on a soil in order to fertilise said soil are known. These vehicles, which can be self-propelled vehicles or trailers towable by a tractor, comprise a tank for containing slurry, a slurry spreader device mounted on the rear part of the vehicle to spread the slurry as the vehicle moves forward, and a pipe for transferring the slurry from the tank to the slurry spreader device. For said purpose, the pipe comprises a pump for pushing the slurry from the tank to the slurry spreader device and an adjustable valve connected to the slurry spreader device for adjusting the quantity of slurry to be spread on the soil.

The above-mentioned vehicle type comprises an analyser device, which is connected to the pipe and allows acquisition of the contents in terms of slurry ingredients or nutrients, and a control unit, which is configured to compare the effective amount of ingredients distributed per surface unit with the target amount of ingredients that should be distributed per surface unit, and adjust opening of the valve based on said comparison in order to spread on the soil an ingredient content close to the target.

The above-mentioned mode of adjustment of the valve connected to the slurry spreader device has proved to be inaccurate, particularly because the ingredient content acquired is influenced by the application conditions such as, for example, the thermodynamic state of the slurry in the pipe system, the type of slurry spreader device and the vehicle movement speed, and therefore cannot be correctly compared with the target ingredient content. The slurry ingredients are consequently deposited on the soil to be fertilised in different amounts from those predicted.

SUMMARY

The object of the present invention is to provide a method for optimising the amount of slurry spread on a soil to be fertilised, which is free from the drawbacks described above and, at the same time, is easy and inexpensive to produce.

In accordance with the present invention, a method for optimising the amount of slurry spread on a soil to be fertilised, and an apparatus for spreading slurry on a soil to be fertilised are provided, as defined in the attached claims.

BRIEF DESCRIPTION OF THE DRAWINGS

The present invention will now be described with reference to the attached drawings, which illustrate a non-limiting example embodiment thereof, wherein.

DESCRIPTION OF EMBODIMENTS

Figure 1:
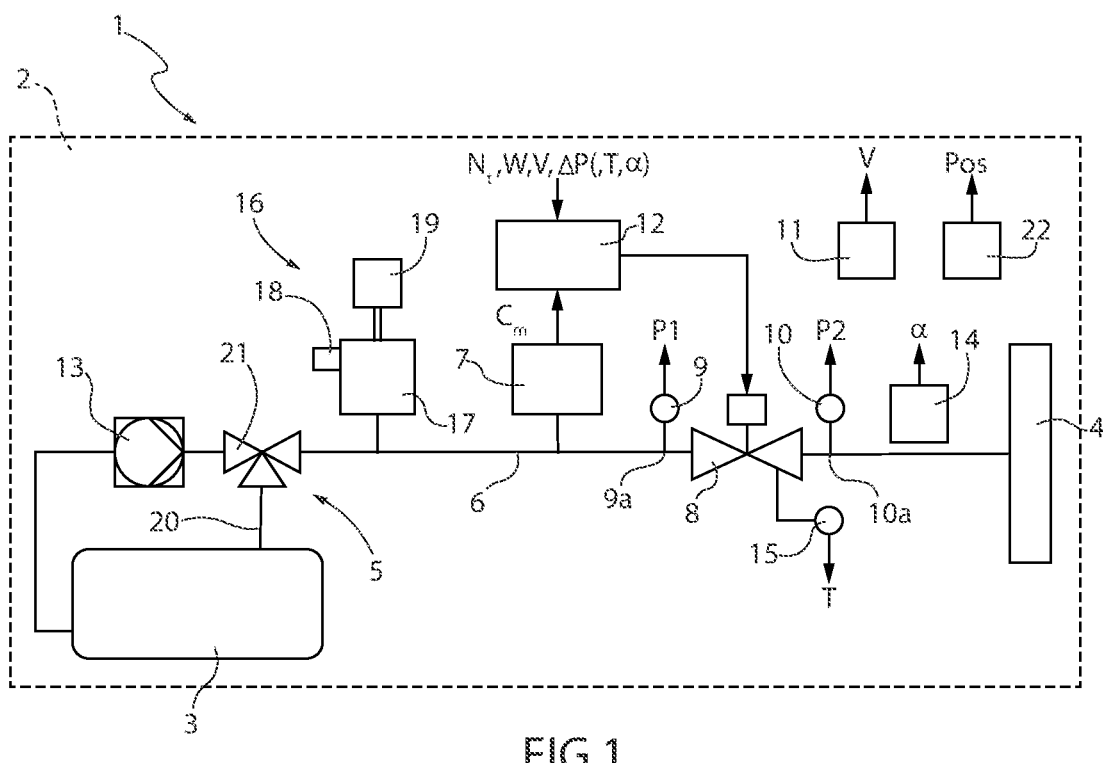
FIG. 1 illustrates a block diagram of an apparatus that implements the method of the present invention.

In FIG. 1, the number 1 generically indicates, overall, the apparatus for spreading slurry on a soil to be fertilised. The equipment 1 comprises a vehicle 2, which is illustrated very schematically by a broken-line box and is of the self-propelled type or towable by a tractor and on which a plurality of components and devices are assembled, described below.

In particular, the vehicle 2 comprises a tank or cistern 3, a slurry spreader device 4, and a pipe system 5, which is suitable for transferring the slurry from the tank 3 to the slurry spreader device 4 and comprises a conduit 6 connected to the slurry spreader device 4.

The vehicle 2 comprises an analyser device 7 connected to the conduit 6 to acquire the slurry composition in terms of concentration of at least one of the slurry ingredients, a valve 8 arranged in the conduit 6 for regulating the flow rate of slurry fed to the slurry spreader device 4, two pressure sensors 9 and 10 for measuring a pressure difference $\Delta P$ between two points $9a$ and $10a$ of the conduit 5 respectively upstream and downstream of the valve 8, and in particular between the outlet and inlet of the valve 8, a speed measuring device 11 for measuring the movement speed V of the vehicle 2, and a control unit 12 for regulating opening of the valve 8 according to the measurements and acquisitions described above and according to pre-defined parameters. In the example illustrated, the pressure difference $\Delta P$ is equal to the difference between the pressure P2 measured by the pressure sensor 10 and the pressure P1 measured by the pressure sensor 9.

In particular, the control unit 12 is configured to calculate an effective volumetric flow rate Q of the slurry and a target volumetric flow rate $Q_t$ of the slurry as a function of the measurements and acquisitions and pre-defined parameters, as will be explained in further detail below, and to adjust opening of the valve 8 as a function of the difference between the effective volumetric flow rate Q and the target volumetric flow rate $Q_t$. In particular, the valve 8 is adjusted according to a closed loop control logic so that the effective volumetric flow rate Q follows the target volumetric flow rate $Q_t$.

The pipe system 5 comprises a pump 13, the outlet of which communicates with the inlet of the conduit 6 to allow transfer of the slurry from the tank 3 to the slurry spreader device 4.

The slurry spreader device 4 is of known type and comprises, for example, a sprinkler or a sprayer provided with pipes open towards the ground. The slurry spreader device 4 is characterised by a spreading width W in a direction orthogonal to the forward movement direction of the vehicle 2.

Advantageously, the analyser device 7 comprises a NIR sensor.

Advantageously, the valve 8 is a proportional valve.

Advantageously, the vehicle 2 comprises an inclinometer 14, which is assembled and calibrated so that it can measure the tilt α of a straight line passing through the two points 9$a$ and 10$a$ relative to a horizontal plane. In detail, the conduit 6 is assembled on the vehicle 2 so that at least the section of the conduit 6 between the points 9$a$ and 10$a$ is maintained normally horizontal when the vehicle 2 travels over flat ground. In this way, the tilt α corresponds to the tilt of the section of conduit 6 between 9$a$ and 10$a$ relative to the horizontal plane.

Advantageously, the vehicle 2 comprises a temperature sensor 15 for measuring the temperature T of the slurry in the conduit 6. Advantageously, the temperature sensor 15 is arranged in the conduit 6 at a point downstream of the analyser device 7, preferably in the valve 8.

Advantageously, the pipe system 5 comprises a bubble trap device 16 communicating with the conduit 5 at a point upstream of the analyser device 7 to intercept and eliminate the bubbles of slurry. In this way, in the acquisitions made by the analyser device 7, the errors due to the presence of the bubbles in the slurry are reduced. In particular, the bubble trap device 16 comprises an expansion chamber 17, which communicates with the conduit 6 and is placed in an elevated position to collect the air bubbles rising from the slurry, a level sensor 18 to detect when the slurry reaches a maximum level in the expansion chamber 17 and a vent valve 19 suitable for expelling the air from the expansion chamber 17 and controlled in closing by the level sensor 18, namely commanded to close when the level sensor 18 detects that the slurry has reached the maximum level.

The pipe system 5 comprises a recirculation branch 20 connected between the outlet of the pump 13 and the conduit 6 by means of a three-way valve 21 arranged upstream of the analyser device 7. This allows periodic recirculation of the slurry in the tank 3 so as to make it uniform and therefore stabilise the concentration data acquired from the analyser device 7.

Advantageously, the bubble trap device 16 communicates with the conduit 6 at a point between the three-way valve 21 and the analyser device 7.

The vehicle 2 further comprises a localisation device 22, for example a GPS device, for acquiring in real time the position of the vehicle 2. The position of the vehicle 2 is expressed in geographical coordinates, namely latitude and longitude.

Advantageously, the speed measurement device 11 and the localisation device 22 are made as one single device that comprises a GPS receiver and is configured to acquire the position of the vehicle 2 and measure the speed V of the vehicle 2.

Note that where in the present document it is stated that a device is downstream or upstream of another device, it shall be understood relative to the transfer direction of the slurry towards the slurry spreader device 4.

Figure 2:
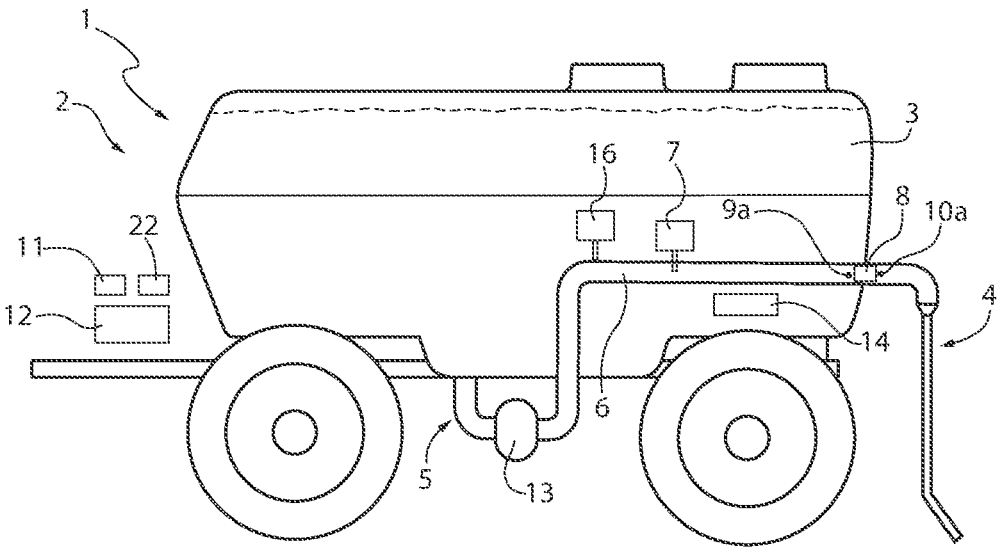
FIG. 2 illustrates a specific embodiment of the slurry distributor system of FIG. 1.

FIG. 2 illustrates a particular embodiment in which the vehicle 2 is a wagon towable by a tractor and the slurry spreader device 4 is a sprayer provided with pipes open towards the ground. In FIG. 2, on board the vehicle 2, the following are illustrated: the tank 3, the pipe system 5 comprising the conduit 6 and the pump 13, the bubble trap device 16, the analyser device 7, the valve 8, the inclinometer 14, the speed measuring device 11, the localisation device 22 and the control unit 12. In FIG. 2 the two pressure measurement points 9$a$ and 10$a$ of the pressure sensors 9 and

10 are illustrated. The conduit 6 is assembled on the vehicle 2 so that at least the section of the conduit 6 between the points 9$a$ and 10$a$ is maintained normally horizontal when the vehicle 2 travels over flat ground.

According to a further embodiment not illustrated, the vehicle 2 is a self-propelled vehicle, and in particular a vehicle comprising a drive and control cab for an operator.

The apparatus 1 implements a method for optimising the amount of slurry spread on a soil to be fertilised by means of a vehicle comprising a slurry spreader device, for example the vehicle 2 described above. In particular, the technical characteristics of the apparatus 1 described previously allow the following steps of the method to be carried out, while the slurry is circulating in the conduit 6:

acquire the composition of the slurry in terms of concentration $C_m$ of at least one ingredient of the slurry;

measure the pressure difference ΔP between two points upstream and downstream of the valve 8;

measure the forward movement speed V of the vehicle 2.

Furthermore, the control unit 12 is configured to carry out the following steps of the method, while the slurry is circulating in the conduit 6:

calculate the effective volumetric flow rate Q as a function of the pressure difference ΔP;

calculate the target volumetric flow rate $Q_t$ as a function of a target spreading factor $N_t$ of said at least one ingredient of the slurry, the concentration $C_m$ acquired of said at least one ingredient, the speed measured V and the spreading width W; and adjust the opening of the valve as a function of the difference between the effective volumetric flow rate Q and the target volumetric flow rate $Q_t$.

The target spreading factor $N_t$ indicates a target amount of ingredient to be spread per surface unit of the soil and is normally expressed in g/m$^2$ or in equivalent measurement units. The concentration $C_m$ is normally expressed in g/Kg, namely it is a pure number (without dimensions).

In detail, the effective volumetric flow rate Q is calculated as a function of the pressure difference ΔP, density ρ of the slurry and flow coefficient $K_v$ of the valve 8, namely a constant that expresses the capacity in flow rate of the valve 8. As is known, the density ρ of the slurry substantially coincides with the density of the water. In further detail, the effective volumetric flow rate Q is calculated by means of the following formula:

$$Q = K_v \cdot \sqrt{\frac{\Delta P}{\rho}}.$$

In detail, the target volumetric flow rate $Q_t$ is calculated not only as a function of the above-mentioned parameters ($N_t$, $C_m$, V, W) but also as a function of a standard density $\rho_s$ of the slurry, measured at a standard temperature, for example 0° C., assuming that the density of the slurry coincides with that of the water. In further detail, the target volumetric flow rate $Q_t$ is calculated by means of the following formula:

$$Q_t = \frac{N_t}{C_m} \cdot \frac{1}{\rho_s} \cdot V \cdot W.$$

Some examples of ingredient, the concentration $C_m$ of which can be measured with the analyser device 7, are: nitrogen (total), phosphoric anhydride, potassium oxide, ammonium ion.

Normally, the target spreading factor $N_t$ of each ingredient is defined as a function of geographical coordinates. In this way it is possible to diversify the spreading target of at least one ingredient for different areas of a soil to be fertilised. For example, the target spreading factor $N_t$ consists of a map of values associated with respective geographical coordinates, the so-called prescription map. Therefore, the value of the target spreading factor $N_t$ used to calculate the target volumetric flow rate $Q_t$ is selected as a function of the position of the vehicle 2 acquired in real time via the localisation device 22.

According to a further embodiment of the method, via the analyser device 7 concentration values of several ingredients of the slurry are acquired and the measured concentration $C_m$ is calculated as a weighted mean of the concentration values of the ingredients, the weights of which to be assigned to the single ingredients are predefined according to certain criteria. Analogously, the spreading factor $N_t$ is calculated as a weighted mean of the spreading factor values of the ingredients considered.

The technical characteristics of the apparatus 1 previously described allow the following optional steps of the method to be carried out, while the slurry is circulating in the conduit 6:

measure the temperature T of the slurry in the conduit 6;
  measure the tilt α, relative to a horizontal plane, of a straight line passing through the two points 9a and 10a of the conduit 6.

Advantageously, the control unit 12 is configured to determine the density value p of the slurry as a function of the temperature measured T and calculate the effective volumetric flow rate Q as a function of the density value ρ. In particular, the density value ρ is corrected based on density-temperature data characteristic of the water, stored, for example in table form, in the control unit 12.

In fact, as known, the density of the water, and therefore of the slurry, decreases as the temperature varies when the latter is higher than 4° C. The correction of the density value ρ allows calculation of the effective volumetric flow rate Q to be refined and therefore allows regulation of opening of the valve 8 to be optimised.

Advantageously, the control unit 12 is configured to calculate the effective volumetric flow rate Q, and as a function of the parameters mentioned above (ΔP and optionally ρ), also as a function of the tilt α measured.

The measured tilt α expresses a difference in height Δy, relative to the horizontal plane, of the two points 9a and 10a of the conduit 6, relative to which the pressure difference ΔP is measured. Therefore, advantageously, the effective volumetric flow rate Q is calculated by means of the following formula:

$$Q = K_v \cdot \sqrt{\frac{\Delta P}{\rho} + g \cdot \Delta y}.$$

in which g is the acceleration of the earth's gravity and the difference in height Δy depends on the tilt α by means of a simple trigonometric relation.

According to a further embodiment of the method, the measured concentration Cm of at least one ingredient is compared with a respective range of concentration values between a minimum value and a maximum value and if the measured concentration $C_m$ is outside said range of values, an alarm message is shown on a display on board the vehicle 2. In particular, a first concentration $C_{m1}$ of a first ingredient, typically the one considered as the main ingredient, is used to calculate the target volumetric flow rate $Q_t$, which in turn affects regulation of the valve 8, and a second concentration $C_{m2}$ of a second ingredient is compared with the above-mentioned range of concentration values in order to display the alarm message.

Figure 3:
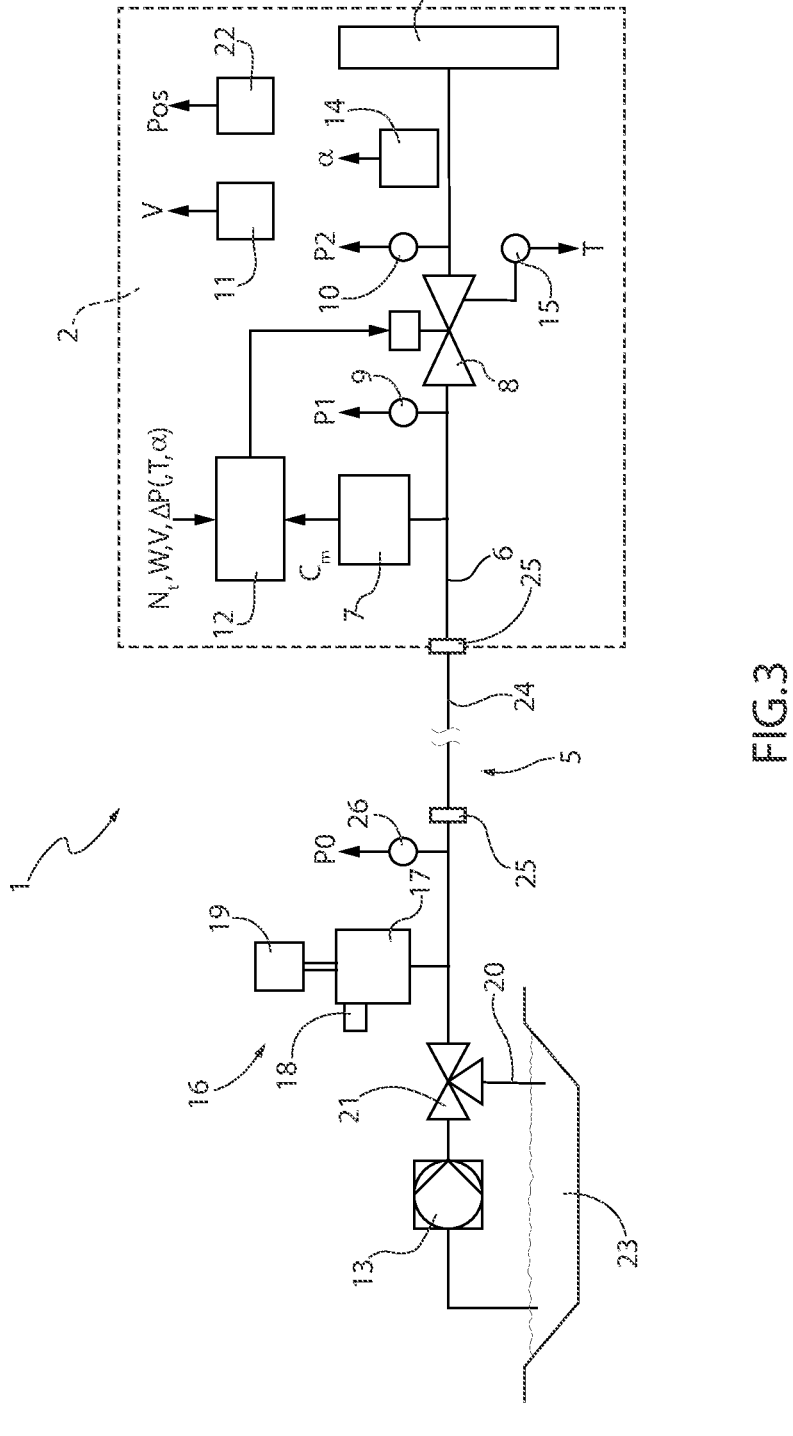
FIG. 3 illustrates a block diagram of a further embodiment that implements the method of the present invention.

According to a further embodiment illustrated in FIG. 3, in which the corresponding elements are indicated by the same numbers and letters as FIG. 1, the apparatus 1 differs from that of FIG. 1 due to the fact that the vehicle 2 is without a tank 3 and the system of pipes 5, except for the conduit 6, is not on board the vehicle 2 and is configured to draw the slurry from a basin or lagoon 23 and to recirculate the slurry in said basin 23. Therefore, the pump 13, the recirculation branch 20, the three-way valve 21 and the bubble trap device 16 are not mounted on board the vehicle 2. The pipe system 5 comprises a rubber pipe 24 to connect the three-way valve 21, or the outlet of the pump 13, to the conduit 6 by means of one or two connectors 25.

The apparatus 1 according to the embodiment of FIG. 3 comprises a further pressure sensor 26 connected downstream of the bubble trap device 16 so that it can measure a pressure value which is used by the control unit 12 to determine any pressure losses along the rubber pipe 24 due to holes and/or breakages.

The main advantage of the above-described apparatus 1 and method is to optimise the quantity of slurry spread on the soil to be fertilised, thanks to the comparison between an effective volumetric flow rate Q and an objective volumetric flow rate $Q_t$, calculated in real time as a function of the measured concentration $C_m$ of at least one ingredient of the slurry, of a target spreading factor of the ingredient $N_t$, which is normally expressed in $g/m^2$, of the speed measured V of the vehicle 2 and of a spreading width W of the slurry spreader device 4. Substantially, the valve 8 is adjusted based on a comparison of volumetric flow rates which also takes account of the measured speed V and the spreading width W.

The embodiment that also takes account of the variations in the densities p with variation in the measured temperature T of the slurry allows increased precision of calculation of the effective volumetric flow rate Q, and consequently increases the precision with which the target spreading factor $N_t$ of at least one ingredient of the slurry is reached. Note that the slurry temperature can reach and exceed even 50° C. when the tank 3 is left in the sun for a long time in the summer.

A further refinement of the method is obtained with the embodiment that calculates the effective volumetric flow rate also as a function of the tilt α of the section of conduit 6 that comprises the valve 8, measured relative to the horizontal plane. The tilt α allows the variation in potential energy of the slurry to be taken into account when the valve 8 is inclined relative to the horizontal plane, and this is a not infrequent situation on ground to be fertilised.

The invention claimed is:

1. An apparatus for spreading slurry on a soil to be fertilised, comprising a vehicle (2), which comprises a slurry spreading device (4), and a pipe system (5), which comprises a conduit (6) connected to the slurry spreading device (4); the vehicle (2) and the pipe system (5) being suitable to transfer the slurry to the slurry spreading device (4); the vehicle (2) further comprising an analyser device (7) connected to the conduit (6) for acquiring the concentration ($C_m$) of at least one ingredient of the slurry, a valve (8) arranged in the conduit (6) for regulating the flow rate of slurry fed to the slurry spreader device (4), pressure sensor means (9, 10) for measuring a pressure difference ($\Delta P$) between two points (9*a*, 10*a*) of the conduit (6) respectively upstream and downstream of the valve (8), a speed measuring device (11) to measure the speed (V) of the vehicle (2), and a control unit (12) configured to calculate an effective volumetric flow rate (Q) of the slurry as a function of the measured pressure difference ($\Delta P$), to calculate a target volumetric flow rate ($Q_t$) of the slurry as a function of a target spreading factor ($N_t$) of said at least one ingredient, the concentration ($C_m$) of said at least one ingredient, the measured speed (V) and a spreading width (W) of the slurry spreading device (4), and to adjust the opening of the valve (8) as a function of the difference between the effective volumetric flow rate (Q) and the target volumetric flow rate ($Q_t$);

wherein said pipe system (5) comprises a bubble trap device (16) communicating with said conduit (6) at a point upstream of said analyser device (7) for intercepting and eliminating bubbles in the slurry;

wherein said bubble trap device (16) comprises an expansion chamber (17), which communicates with said conduit (6) and is placed in an elevated position for collecting air bubbles rising from the slurry, a level sensor (18) for detecting when the slurry reaches a maximum level in the expansion chamber (17) and a vent valve (19) for expelling air from the expansion chamber (17) and controlled in closing by the level sensor (18).

2. The apparatus according to claim 1, wherein the vehicle (2) comprises an inclinometer (14) for measuring the tilt ($\alpha$), with respect to a horizontal plane, of a line passing through said two points (9*a*, 10*a*) of the conduit (6), said control unit (12) being configured to calculate the actual volumetric flow rate (Q) of the slurry as a function of the measured tilt ($\alpha$).

3. The apparatus according to claim 1, wherein the vehicle (2) comprises a temperature sensor (15) for measuring the temperature (T) of the slurry in the conduit (6); said control unit (12) being configured to determine a density value ($\rho$) of the slurry as a function of the measured temperature (T) and to calculate the effective volumetric flow rate (Q) of the slurry as a function of the density value ($\rho$) of the slurry.

4. The apparatus according to claim 3, wherein the temperature sensor (15) is arranged in the conduit (6) at a point downstream of the analyser device (7).

5. The apparatus according to claim 1, wherein said analyser device (7) comprises an NIR sensor.

6. Apparatus according to claim 1, wherein the vehicle further comprises a tank for the slurry and the pipe system is configured to transfer the slurry from the tank to the slurry spreading device.

7. Apparatus according to claim 1, wherein the conduit is configured to transfer the slurry from a basin or lagoon to the slurry spreading device.

8. A method for optimising the amount of slurry that is spread on a soil to be fertilised by means of a vehicle (2) comprising a slurry spreader device (4) fed by slurry container means (3; 23) through at least one feed conduit (6) connected to the slurry spreader device (4), the method comprising:

acquiring the composition of the slurry in terms of the concentration ($C_m$) of at least one slurry ingredient by means of an analyser device (7) connected to the feed conduit (6);

measuring a pressure difference ($\Delta P$) of the slurry between two points (9*a*, 10*a*) in the feed conduit (6) respectively upstream and downstream of a valve (8) placed in the feed conduit (6);

measuring the speed (V) of the vehicle (2);

calculating an effective volumetric flow rate (Q) of the slurry as a function of the measured pressure difference ($\Delta P$) using a control unit (12);

calculating a target volumetric flow rate ($Q_t$) of the slurry as a function of a target spreading factor ($N_t$) of said at least one ingredient, the concentration ($C_m$) of said at least one ingredient, the measured speed (V) and a spreading width (W) of the slurry spreader device (4);

adjusting the opening of the valve (8) as a function of the difference between the effective volumetric flow rate (Q) and the target volumetric flow rate ($Q_t$);

intercepting and eliminating air bubbles in the slurry in the feed conduit (6) upstream of said analyser device (7) using a bubble trap device (16), wherein said bubble trap device (16) comprises an expansion chamber (17), which communicates with said feed conduit (6) at a point upstream of said analyser device (7) and is placed in an elevated position for collecting air bubbles rising from the slurry;

detecting when the slurry reaches a maximum level in the expansion chamber (17) with a level sensor (18); and expelling air from the expansion chamber (17) by means of a vent valve (19) that is controlled in closing by the level sensor (18).

9. The method according to claim 8, and comprising measuring the tilt ($\alpha$), with respect to a horizontal plane, of a straight line passing through said two points (9*a*, 10*a*) of the feed conduit (6);

the effective volumetric flow rate (Q) being calculated as a function of the measured tilt ($\alpha$).

10. The method according to claim 8, comprising:

measuring the temperature (T) of the slurry in the feed conduit (6); and determining a density value ($\rho$) of the slurry as a function of the measured temperature (T);

the effective volumetric flow rate (Q) of the slurry being calculated as a function of the density value ($\rho$) of the slurry.

11. The method according to claim 10, wherein the temperature (T) of the slurry is measured downstream of the analyser device (7).

12. The method according to claim 8, wherein the slurry flows into the feed conduit (6) by the action of a pump (13) and the analyser device (7) is for determining the composition of the slurry downstream of the pump (13).

13. The method according to claim 8, wherein said analyser device (7) comprises an NIR sensor.

* * * * *